United States Patent
Eckelt et al.

(10) Patent No.: US 7,273,532 B2
(45) Date of Patent: Sep. 25, 2007

(54) ASSEMBLY ELEMENT TO BE INSERTED IN A BORE

(75) Inventors: Christian Eckelt, Steyr (AT); Roland Leopoldseder, St-Valentin (AT); Ulrich Hermens, Aachen (DE); Matthias Meissner, Aachen (DE)

(73) Assignee: Saint-Gobain Glass France, Courbevoie (FR)

( * ) Notice: Subject to any disclaimer, the term of this patent is extended or adjusted under 35 U.S.C. 154(b) by 371 days.

(21) Appl. No.: 10/415,650

(22) PCT Filed: Nov. 9, 2001

(86) PCT No.: PCT/FR01/03510

§ 371 (c)(1), (2), (4) Date: Oct. 14, 2003

(87) PCT Pub. No.: WO02/38902

PCT Pub. Date: May 16, 2002

(65) Prior Publication Data

US 2004/0055697 A1 Mar. 25, 2004

(30) Foreign Application Priority Data

Nov. 11, 2000 (DE) ................ 100 55 983
Dec. 20, 2000 (DE) ................ 100 63 547

(51) Int. Cl.
- *B29C 65/00* (2006.01)
- *E06B 3/00* (2006.01)
- *E06B 3/54* (2006.01)

(52) U.S. Cl. ............ 156/293; 52/204.5; 52/204.6; 52/204.62; 52/204.67; 52/204.7; 411/511; 411/908

(58) Field of Classification Search ............ 52/204.5, 52/204.6, 204.62, 204.67, 204.7; 411/511, 411/908

See application file for complete search history.

(56) References Cited

FOREIGN PATENT DOCUMENTS

| DE | 43 11 442 | | 7/1994 |
|---|---|---|---|
| DE | 4342097 | * | 6/1995 |
| DE | 19515904 | * | 11/1995 |
| DE | 4436484 | * | 4/1996 |
| DE | 299 21 128 | | 1/2000 |
| DE | 198 58 527 | | 8/2000 |

(Continued)

*Primary Examiner*—Justin R. Fischer
(74) *Attorney, Agent, or Firm*—Oblon, Spivak, McClelland, Maier & Neustadt, P.C.

(57) ABSTRACT

An assembly element to be inserted into a bore, with two compensating elements fitting one into the other and having eccentric bores. The assembly element is provided for transmission of forces to the inner surface of the hole of the bore and for positioning the longitudinal axes of a fastening element within the through-bore, and is produced with a smaller radial dimension with respect to at least one exit of the bore in the outer face of the plate for forming a slot and can be fastened in the bore by a sealing agent filling the slot. An assembly element for a laminated pane, which includes at least three individual panes and has at least one hole passing through all the individual panes for installing or accommodating a rod-shaped fastening element, includes an attached element with a through-bore to be fastened to the outer panes, and a mechanism for aligning deviations of the hole centers of the two through-bores. The rod-shaped fastening element can be inserted at least indirectly into the aligned through-bores.

17 Claims, 5 Drawing Sheets

FOREIGN PATENT DOCUMENTS

| | | |
|---|---|---|
| EP | 0 655 543 | 5/1995 |
| EP | 0 965 721 | 12/1999 |
| FR | 2 732 730 | 10/1996 |
| WO | 96 22443 | 7/1996 |

* cited by examiner

ASSEMBLY ELEMENT TO BE INSERTED IN A BORE

The invention relates to an assembly element to be inserted into a bore which is provided, in particular, as a bore passing through a plate, for example a glass plate, of the type comprising at least one outer and inner compensating element, in which the outer compensating element is provided for transmitting forces to the inner surface of the hole of the bore and the inner compensating element can be inserted with a close fit into a bore arranged eccentrically in the outer compensating element and is provided for positioning the longitudinal axis of a fastening element within the through-bore.

A known fastening system for double glazings (EP-B1 0 506 522) makes it possible to compensate central deviations of prefabricated bores, placed in alignment before the assembly of the two panes, with the aid of two eccentric rings fitting one into the other. As uniform a transmission as possible of the load of the two panes to a rod-shaped fastening element is considered to be achieved in this way. The position of a bore in the outer pane is taken as the reference basis, whilst the eccentric rings are inserted as compensating pieces into the hole of the inner pane, in order to compenste a possible transverse deviation of this hole with respect to the centre of the bore produced in the outer pane. The result is that the bore of the inner eccentric ring is coaxial to the bore produced in the outer pane. If the fastening element is inserted once only, the two eccentric rings can no longer rotate relative to one another. However, they are not fastened separately to one another or to the pane.

A known fastening system for plates (DE-A1-198 39 419) comprises compensating pieces with an eccentric bore which can be inserted into receiving orifices of a framework. By virtue of different angular positions of the compensating pieces in the receiving orifices, it is possible to compensate dimensional deviations between the position of the receiving orifices and the position of bores in the plates to be fastened.

The document DE-A1 41 30 823 describes a pane equipped with a fastening element in a plurality of parts, which comprises an elastic bush which can be compressed axially between two panes by the tightening of screws. This bush surrounds a metal core which, by means of screw bolts or the like, can be assembled together with a framework which is to carry the frames. By the screws being tightened, the elastic bush expands radially and thus ensures a non-deformable and unreleasable assembly of the core together with the pane solely as a result of the axial pressure forces exerted on the inner face of the hole. This fastening element can be used equally for monolithic panes or for laminated panes.

Fastening or assembly means of this type are used mainly for glazings of facades of great extent, in order to assemble the glass plates together with a framework which carries them. Sometimes, however, glass plates laid in the same plane have to be assembled together at their edges. One application in this respect relates to the reinforcing elements for glazed facades, these reinforcing elements being produced in the form of tall slender beams (known as glass spines or glass crossbracings) and being joined firmly along great lengths from a plurality of laminated glass plates arranged in alignment. In the edge or assembly regions, use is most often made of lugs or clamping plates placed outside and sometimes also of fittings inserted between a plurality of panes of a (laminated) glass plate. These are usually fastened by means of rod-shaped holding elements, such as bolts or screws, which pass through the plates.

Even in these applications, the glass plates must be fitted with assembly elements suitable for the passage of bolts/screws. These must, on the one hand, ensure a reliable hold of the lugs or of the fittings and, where appropriate, prevent direct contact between the glass and the metal, and, on the other hand, position the necessary bores or their central axes as exactly as possible in the face of the plate in relation to the edges of the latter. Dimensional deviations in the fittings themselves are relatively negligible.

Methods are known from practice, in which the separate pieces of the assembly elements have to be assembled with difficulty on site and positioned in the bore of the plate. They are then seated on the inner face of the hole with the aid of liquid or pasty compounds.

There is therefore a great need for assemblies which act on the inner wall of holes for plates made, in particular, of lamianted glass and which are prefabricated at the factory with as small position tolerances as possible, so that the plates can be joined to one another simply and quickly on site. By the factory prefabrication of the plates fitted with the assembly elements, it is possible to ensure as high a quality and safety of the assemblies as possible under reproducible conditions. At the same time, it is possible to ensure industrial and therefore economical manufacture.

To produce assemblies acting on the inner wall of holes, it is preferable to have a connection of the assembly element inserted into a bore of the glass plate with force transmission (in particular, by clamping) to the lateral surface of this same bore. It is known, however, that it is virtually impossible, as soon as through-bores are made in a laminated glass, to align the bores exactly in the various glass plates. On the contrary, it is always necessary to compensate dimensional deviations or tolerances, which occur on the diameters of the bores, on the position of these in the faces of the assembled plates and ultimately, though to a lesser extent, on the assembly elements to be inserted themselves. This requires an efficient and technically irreproachable manufacturing process during the fastening of the assembly elements in the bores of the plates.

Particularly during the assembly of laminated panes, inter alia, together with fittings or with a carrying structure (it is sometimes also necessary to assemble together, edge to edge, laminated plates arranged in the same alignment), in contrast to monolithic plates, it is not possible to use any of the conventional screwed assemblies, in which one or more holes are made and two clamping pieces in engagement on the outer faces of the plates are clamped on one another by means of a screwed assembly passing through the hole. In laminated panes, a flow of the organic connecting layer may occur, particularly under the action of the clamping forces. The laminated pane is deformed, its thickness decreases and the screwed assembly is released. Measures must therefore be taken to prevent this phenomenon.

The document DE 198 12 814 A1 discloses a laminated pane provided with a glass-beam fastening for assembling by clamping together with a carrying structure or with other glass plates. The glass-beam fastening is composed of a hole made in the individual panes of the laminated pane and of a moulding resin introduced into said hole and of a sleeve covering said resin. Annular washers screwed to one another are applied to the glass externally, sealing washers being arranged between the annular washers and the glass surfaces. According to the teaching of DE 198 12 814 A1, a pair of bushes screwed one in the other is applied to the sleeve internally, and the annular washers are assembled by clamping together with the respective ends of the bushes. Since the liquid moulding resin is poured into the hollow space between the sleeve and the hole, it is possible for the individual pieces to be mounted only when the glass plates are in the horizontal position. Moreover, during the manufacture of this glass-beam fastening, care must be taken to fill the hollow space completely, because the moulding resin transmits the forces to the panes. Furthermore, clamping forces are likewise exerted to some extent on the connecting layers.

DE-1 99 01 513 discloses a fitting for an element glazed in laminated glass to be mounted without a frame, said fitting being fastened to only one of the two individual sheets of the lamination by means of a clamped assembly. This avoids the adhesive layer of the lamination being subjected to clamping forces.

The object of the invention is to develop an improved assembly element and also to specify a method for inserting the assembly element into the bore of a plate.

As regards the assembly element, this object is achieved, according to the invention, by means of the characteristics of claim 1. The characteristics of claims 12 to 14 relate to plates equipped with at least one assembly element according to the invention and to an assembly of such plates. Claims 15 to 17 specify a preferred method for inserting the assembly element into a plate. Claim 18 relates to another assembly element specialty designed for laminated panes with three individual sheets. Finally, claim 24 relates to laminated panes which are equipped or assembled with the assembly elements according to claim 18.

The characteristics of the subsidiary claims or of those referring back to the independent claims propose advantageous improvements of these.

A plastic and/or metal assembly element is proposed in a first embodiment, capable of being adapted exactly to the dimensions of the respective bore in the plate (diameter, length or depth) or to the thickness of the plate and capable of being inserted into the bore having a smaller radial dimension, said assembly element comprising, in the first place two compensating elements fitting one into the other, at least one of these compensating elements comprising a bore arranged off-centred or eccentrically.

The assembly element has, broadly speaking, the function of positioning in a predetermined position, within the bore of the plate, the longitudinal axis of a rod-shaped fastening element, in particular of a holding bolt.

After the correct positioning of said longitudinal axis, each assembly-element/plate complex is fastened in a definitively unremovable manner in the corresponding bore of the plate, with a sealing agent being poured therein.

The bore of the plate does not necessarily have to be a through-bore. On the contrary, in some applications, a blind bore may also be fitted with an inserted assembly element of the type described here. In this case, the associated rod-shaped fastening element can, of course, emerge only from one main face of the plate. As regards relatively thick plates, however, two blind holes arranged exactly opposite one another could also be fitted in the way described here. In these applications, a bore for supporting the inner compensating element may likewise be produced in the form of a blind bore.

In an advantageous variant, the two compensating elements are provided, furthermore, with channels which are at least tangent to the parting plane between the two compensating elements and through which the pasty, flowing and hardenable seating agent can be poured or pressed, in order also to interlock the two compensating elements with one another after it has hardened. The seating agent thus achieves two different objects: on the one hand, it blocks the whole of the composite assembly element with respect to the inner face of the hole and, on the other hand, it fastens the two parts of the assembly element to one another internally.

The outside diameter of the inner compensating element corresponds as exactly as possible to the diameter of the off-centred bore of the outer compensating element. This largely prevents the seating agent from escaping from the ducts which must follow or at least touch the parting plane between the two compensating elements.

In a preferred embodiment, the two compensating elements are in the form of a bush and are provided with eccentric bores. Bolts or screws can be inserted, with slight radial play, into the bore of the inner compensating element, to be considered as the supporting bore.

In another embodiment, only the outer compensating element in the form of a bush is provided with an eccentric bore, whilst the inner compensating element which fits into this bore is assembled firmly together with journals which project at least on one side, preferably on both sides, and the longitudinal axis of which is arranged eccentrically with respect to the longitudinal axis of the inner compensating element and which themselves form a rod-shaped fastening element. Combinations of the two variants are also possible, with a journal projecting on one side and a supporting bore provided on the other side, which, in this case, will be produced in the form of a blind bore.

A wide range of dimensional deviations can be compensated by means of the two configurations. Position tolerances of the bores in the plates and, where appropriate, dimensional deviations of the plates themselves are compensated within wide limits, due to the fact that the two compensating elements capable of rotating relative to one another are inserted into the bore of the plate, with the aid of a suitable fixture or template, and temporarily fastened in such a way that the central axis of the supporting bore or of the projecting journals of the inner compensating element is, before the introduction of the sealing agent, in the intended position which, as a general rule, is defined by its distance from one or more reference points of the plate.

If a supporting bore is provided in the inner compensating element, its central axis is advantageously positioned by means of an auxiliary journal which forms part of the fixture and which largely fills the supporting bore and prevents sealing agent from penetrating into the supporting bore. Such a fixture can be designed for the simultaneous insertion of a plurality of assembly elements according to the invention into a plate; it will then comprise a corresponding number of auxiliary journals.

If the inner compensating element is provided with projecting journals, the mounting fixture will comprise at least one recess which corresponds to the diameter of the projecting journal and into which the latter can be inserted, while at the same time being rotatable. Although this embodiment may reduce the number of pieces for assembly, it increases the overall size of the plates for transport, for example, from the factory to the site, because the journals emerge from the main face of said plates.

In a preferred embodiment, the two compensating elements are therefore of cylindrical shape, with planar end or front faces, into which issue the respective off-centred through-bores. Preferably, the two compensating elements are also the same length, and they are adapted to the thickness of the respective plate, in such a way that they do not emerge beyond the faces of the plate after they have been inserted into the through-bore of the plate. Depending on the possibilities, the front faces of the compensating elements must be flush with the surfaces of the plate.

The compensating elements may be composed of metal and/or of suitable plastics. Where appropriate, the inner compensating element, which does not come into contact with the (glass) plate, may be composed of metal and the outer compensating element of plastic. This will be the case, in particular, when the inner compensating element forms a unitary entity with the rod-shaped fastening element, even if it is conceivable, here, to have an entity composed of a metallic material for the journal and of a plastic material for the actual compensating element.

Preferably, the ducts issue in the lateral surface of the outer compensating element. According to one embodiment, at least two radial bores are made in the lateral surface of the outer compensating element in the vicinity of the front faces of the latter. These bores likewise form ducts which connect the lateral surface of the outer compensating element to the eccentric bore of the latter. The outer compensating element is produced, moreover, with a smaller radial dimension, at least with respect to the exit regions of the bore of the plate. Consequently, between its lateral surface and the inner face of the hole, there is an annular slot which may be filled with the seating agent and which allows the seating agent to penetrate from outside into the associated radial bore and also into the associated ducts of the inner compensating element.

For this purpose, at least one duct has been made in the lateral surface of the essentially cylindrical inner compensating element, said duct fluidically connecting the two radial bores in the outer compensating element to one another.

In a preferred embodiment of the ducts, two annular grooves are arranged in the lateral surface of the inner compensating element in the vicinity of its planar front faces, in such a way that they are both covered by the outer compensating element and communicate with said radial bores. This ensures fluidic communication between the radial bores and the ducts in any angular position of the two compensating elements capable of rotating relative to one another. Furthermore, at least one additional groove which connects the two annular grooves and which extends preferably parallel to the longitudinal axis of the compensating element has been made.

In a variant, the entire lateral surface of the inner compensating element could even be indented to some extent all-round in the region between the two annular grooves or between the radial bores, so that this results, overall, in a flat annular duct which connects the radial bores, of which there are at least two, of the outer compensating element.

The cross sections of these grooves may, in principle, be of any shape, but they should be selected and dimensioned such that the sealing agent can flow into them or be pressed into them with low flow resistance. In terms of the manufacturing technique, a semicircular cross section of the grooves may be advantageous.

This configuration has, overall, the advantage that, irrespective of the mutual angular position of the two compensating elements, the sealing agent passes reliably, via the filling bore and the annular groove communicating directly with the latter, into the longitudinally oriented groove and, from there, into the second annular groove and into the second bore, from where it finally flows into the annular slot located on the other side between the assembly element and the inner face of the hole. The sealing agent may even be introduced solely from one side, a total filling of the available hollow spaces on both sides nevertheless being obtained.

Another advantage is that the front faces of the two compensating elements may be perfectly smooth, without exit ports of bores or the like. In particular, all traces of the sealing agent may either be avoided there completely or, at all events, simply be removed.

In a variant of the configuration of the ducts, however, these could also issue in the front faces of the assembly element. Where appropriate, these exit ports could even be located in the parting plane itself. However, at least one duct for communicating with the lateral surface of the outer compensating element must be provided each time in the vicinity of the front faces of the latter, so that the annular slots towards the inner surface of the hole of the through-bore are likewise filled with the sealing agent introduced via the ducts.

According to yet another variant, a network of ducts could be provided virtually solely in the inner surface of the bore of the outer compensating element, the lateral surface of the inner compensating element being provided, however, with some roughness, with teeth, with furrows or the like, at least in a region distant from the front faces of the latter. In such a configuration, the parting plane between the two elements is only merely touched, in practice, by the network of ducts. If the sealing agent is then pressed through the network of ducts, it also fills this roughness, these teeth, etc. After it has hardened, interlocking also takes place by the forms of the two compensating elements being matched to one another. The reverse of this arrangement may, of course, also be implemented by providing the network of ducts solely in the lateral surface of the inner compensating element and the roughness, etc. solely in the inner surface of the hole of the outer compensating element.

Particularly for the use of such assembly elements in blind bores, a layout of the ducts may also be proposed, in which both the entry and the exit of the sealing agent is possible in the region of the exit port of the blind bore. For example, the seating agent, after filling the annular slot at the exit port, could flow as far as the bottom first through a first longitudinal duct substantially parallel to the longitudinal axis of the blind bore along the parting plane. A hollow space present, for example, between the internally placed end of the assembly element and the bottom of the blind bore may be filled with the sealing agent, if said longitudinal duct issues in this region. A second longitudinal duct could be provided, through which the sealing agent could flow back again towards the air-exhaust or exit port. The latter would preferably be located in the front face of the assembly element.

The penetration of sealing agent into a supporting bore of the inner compensating element would be prevented again by an auxiliary journal of the mounting fixture filling said bore or else by the supporting bore itself being produced in the form of a blind bore. If, with such a configuration of the ducts, there is no need to fill a hollow space at the bottom of the blind bore in the plate, the sealing agent could be deflected, still within the assembly element, between the two longitudinal ducts also by means of an annular groove or the like.

In an even simpler variant, the interlocking of the two compensating elements could also be obtained by the filling with the sealing agent of a simple annular duct extending between two radial orifices or bores opposite to one another, said duct being located in the parting plane of the two compensating elements, if sufficient security against rotation is also achieved thereby.

The duct configurations last discussed could, of course, also be used in the case of the insertion of assembly elements into through-bores, provided that all the annular slots between the inner surface of the hole and the outer compensating element can be filled completely from only one exit side of the through-bore.

The mounting fixture already mentioned will also comprise, in addition to the auxiliary journal or journals, seating elements which are capable of shutting off relative to the outside the region of the exits of the through-bores in the plate, by forming planar surfaces in alignment with the faces of the plate. At least one of the sealing elements must comprise a filling orifice, via which the sealing agent can be poured or pressed. The sealing element located opposite should be provided with an air-exhaust (or degassing) orifice, via which the air expelled from the hollow spaces by the sealing agent introduced under pressure can escape. If sealing agent finally emerges via the exhaust orifice, the hollow spaces are completely filled. If the entry and exit orifices for the sealing agent are on the same side as the assembly element, an air-exhaust orifice in the second sealing element may, of course, be omitted. For the insertion of assembly elements into blind bores of the plate, it would, of course, be necessary to have only a single sealing element in the region of the exit port of the blind bore, and this sealing element could then also prevent the assembly element from being expelled under the possible pressure of the sealing agent from the bottom of the hole.

In the embodiment of the assembly element for a laminated pane, attached elements fastened independently of one another, with through-bores are applied to the two outer panes of the laminated pane. These elements may be applied even before the assembly of the individual panes, for example by means of separate screwed assemblies, the nuts of which may be accommodated in the hollow space formed by the holes in the inner panes. The associated screws have through-holes and they are therefore produced in the form of bushes.

However, the attached elements may also be fastened in the holes by other means, for example by adhesive bonding or moulding, or be wedged there by plastic deformation.

Since the holes pierced in the individual panes of the laminated panes are each made separately, axial deviations of the centres of the holes after the manufacture of the laminated pane are inevitable. Instead of costly positional measures, use is preferably made, as means of alignment of the through-bores of the attached elements, of washers or rings with eccentric bores to be inserted into these through-bores. This means that the through-bores have larger diameters than the assembly elements to be inserted. In principle, however, it may be sufficient to provide a compensation of the deviations of the centres of the holes only in one of the attached pieces. One of the through-bores could be considered, for example, as the "normal position". The through-bore of the other attached element should be sufficiently large for an eccentric ring to be capable of being inserted there to compensate the centres of the bores. The bore of the eccentric ring should have the same diameter as the smallest through-bore.

In a preferred embodiment, however, deviations of the hole centres of the through-bores are compensated with the aid of pairs of eccentric rings fitted into the respective through-bore. The eccentric rings have a circular outside diameter and a decentred or off-centred bore, the outside diameter of the smallest eccentric ring of the pair corresponding to the diameter of the decentred bore made in the largest eccentric ring. The decentred bores of the small eccentric rings may be brought into exact alignment with one another simply by a rotation of the eccentric rings of the pair. The overall arrangement in the hole of the laminated pane then forms a bearing pillow for the insertion of the rod-shaped fastening element, for example a screw bolt.

The rod-shaped fastening element may be seated directly or indirectly there by the use of a mounting bush extending between the outer surfaces of the Laminated pane. The length of the preferably cylindrical mounting bush is adapted to the thickness of the respective laminated pane, in such a way that it does not project beyond the faces of the pane after it has been put in place in the bearing pillow. Depending on the possibilities, the end faces of the mounting bush must be flush with the surface of the panes.

If it is not intended to provide a separate mounting bush, the rod-shaped fastening element may also itself be provided with annular shoulders. The spacing of these must then again correspond to the thickness of the laminated pane, so that they can transmit (clamping) forces occurring in the axial direction of the fastening element.

Even if fastening fittings are then clamped from outside onto the faces of the laminated pane in the region of the bearing pillow of the fastening element, no pressure force is exerted on the laminated pane itself. The intermediary connecting layers cannot be deformed. The radial transmission of the loads takes place only via the outer washers.

A particularly advantageous variant of the laminated pane according to the invention has holes with chamfers in the outer panes. The screw to be introduced into the hole carries a corresponding counter-chamfer. The dimensions of the chamfer and of the counter-chamfer are selected such that the head of the screw is level with the surface of the laminated pane. This results, on the one hand, in a particularly aesthetic appearance of the laminated pane, because the head of the screw is virtually level with the outer surface of the outer pane, and, on the other hand, in the transmission of the load via the outer panes taking place with particularly low moments of flexion, because the point of application of the load is near the median line of the pane.

Another possibility for a flush arrangement of the head of the screw and of the outer pane involves equipping a through-hole made in the outer pane, on the surface located outside, with a deep cylindrical milled hole of larger diameter. The diameter and depth of this deep hole correspond largely to the dimensions of the head of the screw, so that the latter can be fitted into the recess of the deep hole.

In another embodiment of the laminated pane, it may be advantageous to fill with a hardenable compound, for example a moulding resin, the hollow spaces remaining within the laminated pane after the screwed assemblies, eccentric rings and mounting bush have been put in place. On the one hand, the screwed assemblies can thereby be blocked and, on the other hand, the laminated pane is made leak-tight with regard to atmospheric influences, in particular with regard to the penetration of moisture. Likewise, the mechanical load-bearing capacity of the mounting bearing pillow can be increased, because the hardenable compound transmits the applied forces and moments towards the inner surfaces of the holes of the individual panes. In this case, rigidity is likewise increased in this region of the mounting bearing cushion, so that higher loads are possible.

The hardenable compound is introduced as carefully as possible into the holes of the outer panes via ducts in the mounting bush, the eccentric washers and/or the tightened screws. If an introduction duct does not issue into the hollow space to be filled, it is necessary to have a radial hole for communication towards the introduction duct. In addition to one or more introduction ducts, it is expedient, in most cases, also to provide an air-exhaust duct, in order to ensure that the hollow space is filled quickly and completely with the hardenable compound. Expediently, the air-exhaust duct is found in the pieces located on that side of the laminated pane which faces the introduction duct. Two-component moulding resins have proved useful as a hardenable compound, because their hardening time is adjustable. The ducts may be shut off by suitable separate means or by the hardened compound itself.

The individual panes of the laminated pane for a glazed structure are composed, as a general rule, of monolithic safety glass which is tempered or partially tempered. It also comes within the scope of the invention, however, to make use of individual panes made of plastic or ceramic. The individual panes may, as the case may be, be transparent, translucent or opaque or else be provided with a colouring, with a pattern or with a layer reflecting electromagnetic radiation. Thermoplastic polymers, in particular polyvinyl butyral, have proved useful as a material for the connecting layers. Known materials, such as polyurethane or vinyl ethylene acetate, may, however, also be used for this application. The connecting layers may also be given other functions. For example, heating filaments may be incorporated into a connecting layer, or a carrying film with a coating reflecting electromagnetic radiation may be arranged between two connecting films.

Other details and advantages of the subject of the invention will be provided by the drawing of exemplary embodiments and by the following detailed description of these.

In these drawings, which are simplified illustrations.

Figure 1:
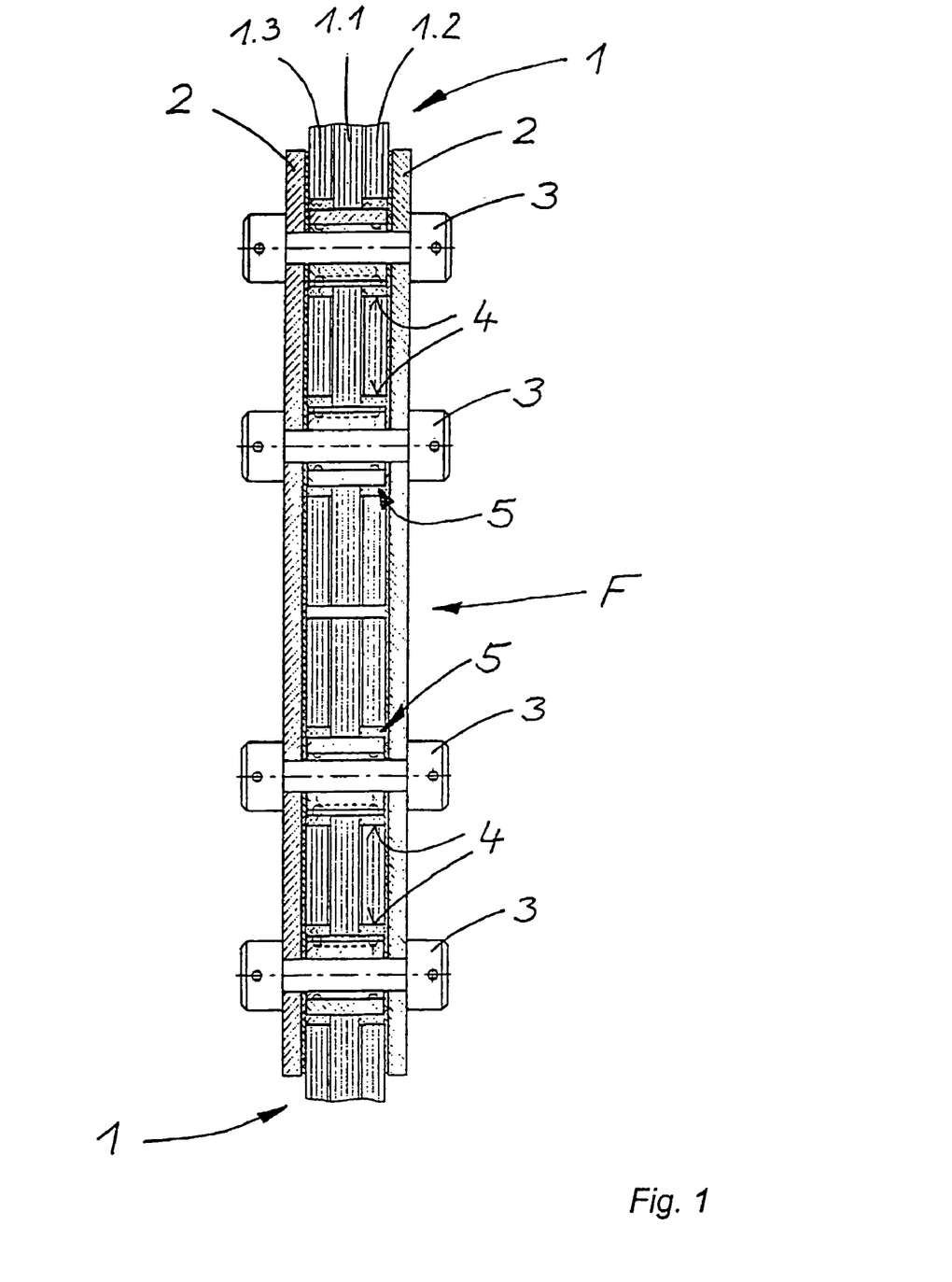
FIG. 1 shows a view of an edge-to-edge assembly of two plates.

FIG. 1 shows an edge-to-edge assembly of two plates 1 arranged in alignment, which are assembled together by means of fittings 2. The fittings 2, produced in the form of clamping plates on both sides, are each time fastened to the plates with the aid of two (screw) bolts 3 passing through the plates 1 and are applied over a large surface, by means of intermediate layers, to the main faces of these plates, thus covering the contact plane F between the plates. This results in a good transmission, by means of the fittings 2, of the forces exerted on the edge-to-edge assembly.

The plates 1 themselves have the form, here, of laminated panes, each with three individual panes 1.1 (inner), 1.2 and 1.3 (outer), in addition to the corresponding adhesive bonding layers. In the vicinity of their sides in contact with one another, they each have two through-bores 4, into each of which is inserted an assembly element 5. The latter form the actual passages for the bolts 3 and will be described in more detail later.

Figure 2:
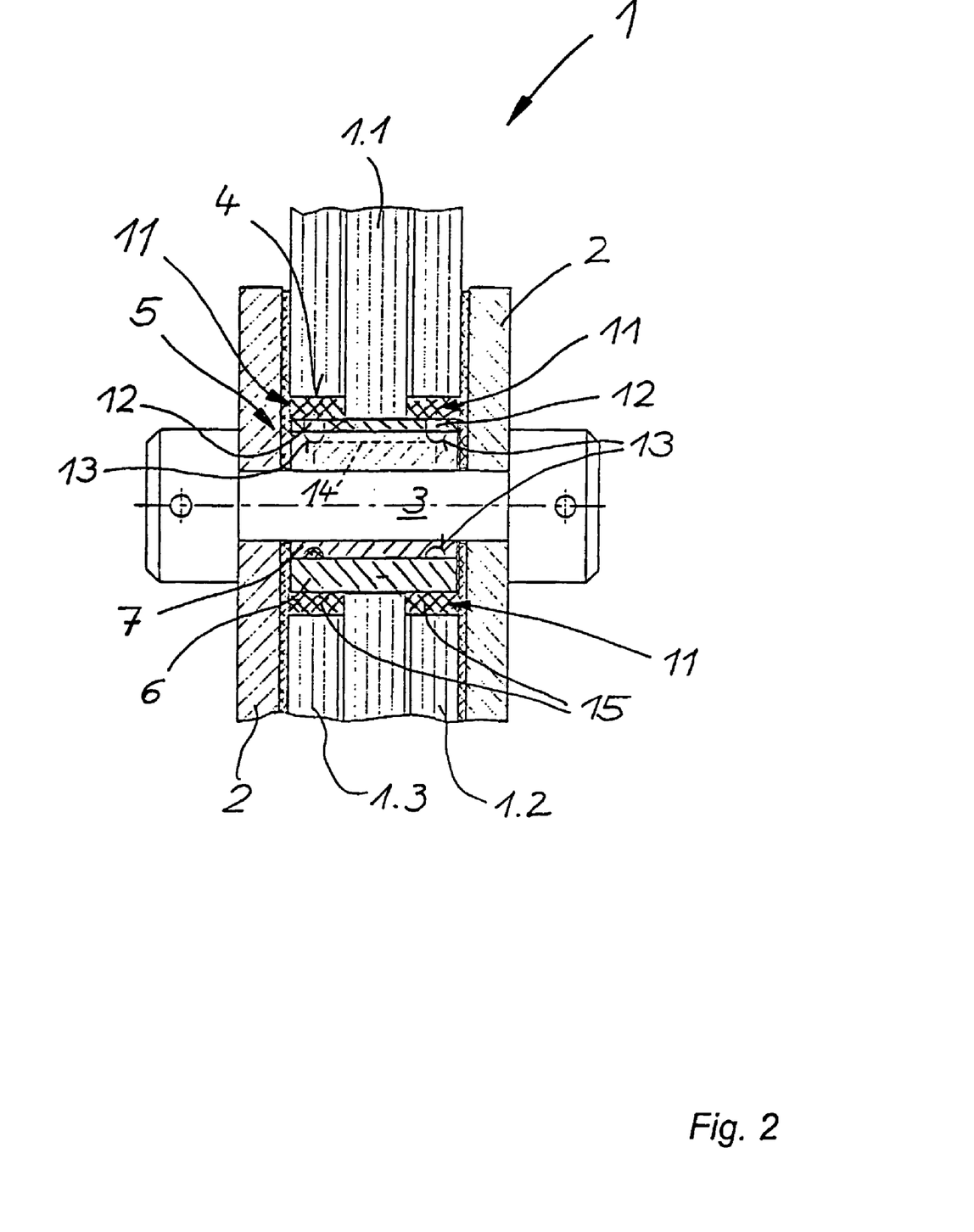
FIG. 2 is a sectional illustration of an assembly element inserted into a plate, this being a detail taken from FIG. 1.

FIG. 2 shows more clearly that the hole in the inner individual pane 1.1 has a smaller diameter than the adjacent holes in the outer individual panes 1.2 and 1.3. Consequently, the through-bore 4 of the plate 1 has a stepped lateral surface or inner surface. The largest inside diameter of the bore 4 is located in the regions of its exit ports into the two outer faces of the plate 1. By virtue of the different sizes of holes, relative position and diameter tolerances of the holes in the individual panes are compensated in a simple way. However, the position of the central axis of the through-bore 4 is not thereby sufficiently defined in relation to the sides of the plate 1.

This purpose is served, on the contrary, by the assembly element 5 inserted into the bore 4. It is composed of an outer compensating element 6 and of an inner compensating element 7. Both are essentially in the form of a bush and have the same length. Their lengths are also adapted as exactly as possible to the thickness of the plate 1. Their smooth front faces are in alignment with the two main faces of the plate 1. To compensate possible tolerances in the thickness of the plates, the length of the assembly elements will be adjusted to the smallest acceptable plate thickness. For thicker plates within the tolerance limits, this may result in a slight underdimensioning of the assembly element.

Figure 3:
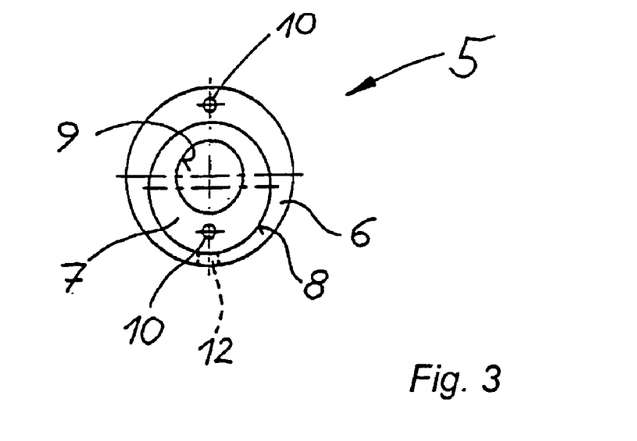
FIG. 3 is a view of the front face of the assembly element according to FIG. 2 in the mounted state.

As may already be seen in FIG. 2, and as is also illustrated more clearly by the front view of the assembly element 5 in FIG. 3, the two compensating elements 6 and 7 each have respectively a bore 8 and a supporting bore 9 located in an off-centred position in relation to their longitudinal or central axis. The cylindrical inner compensating element 7 can be inserted into the bore 8 with as little play as possible. Its supporting bore 9 receives the bolt 3 virtually without any play. The assembly element 5 can first rotate as a whole within the through-bore 4, and the inner compensating element 7 can rotate freely in relation to the outer compensating element 6.

The central axis of the supporting bore 9 can be positioned within very wide limits deviating from a theoretical mean position, by the two compensating elements 6 and 7 being rotated one in the other or within the through-bore 4, markings 10 on the front faces of the compensating elements 6 and 7 being capable of indicating the position of greatest eccentricity of the bore in question. These markings are merely indications intended for assisting the fitters.

As may be seen in FIGS. 1 and 2, the cylindrical outer compensating element 6 has approximately the same diameter as the hole in the inner pane 1.1. There are, however, two free annular slots 11 in the region of the holes of the outer panes 1.1 and 1.3. Each of these annular slots communicates with a radial bore 12 which connects the lateral surface of the outer compensating element 6 to its off-centred bore 8. The lateral surface of the inner compensating element 7 has provided in it, again in alignment with the position of the radial bores 12, annular grooves 13 which are connected to one another by means of a longitudinally running groove 14. More than two radial bores 12 could also be provided in the outer compensating element 6, for example opposite to one another in pairs in relation to the bore 8. This would be conducive to a uniform filling of the annular grooves 13 with the sealing agent.

Figure 4:
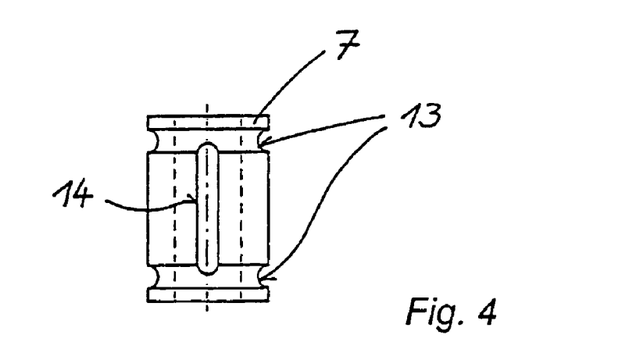
FIG. 4 is a view of an inner compensating element of the assembly element, this view being intended to illustrate the arrangement of the ducts for the sealing agent.
Figure 5:
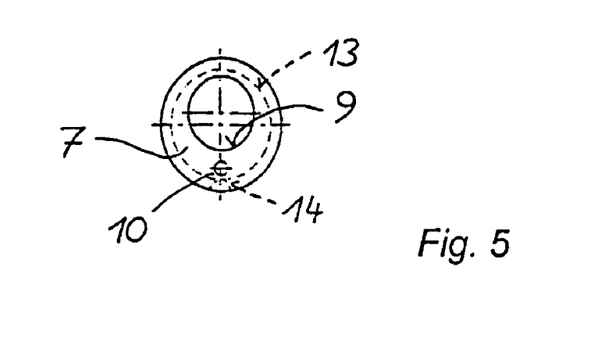
FIG. 5 is another view of the same compensating element rotated through 90° in relation to FIG. 4.

FIG. 4 illustrates the arrangement of the annular grooves 13 and of the groove 14 in the lateral surface of the inner compensating element 7. It would, of course, also be possible to provide more than one longitudinally running groove, in order to reduce the flow resistance. FIG. 5 likewise gives indications regarding the arrangement of the grooves in the lateral surface of the compensating element 7.

For insertion into the through-bore 4, the mounted assembly element 5 is temporarily fastened preferably by means of an auxiliary journal of a mounting fixture, not illustrated here, said journal passing through and completely filling its supporting bore 9. This auxiliary journal has a fixed reference position in relation to at least one reference side of the plate, so that the central axis of the supporting bore 9 of the inner compensating element 7 necessarily comes into place or is positioned in the desired intended position within the through-bore 4.

The assembly element 5 is definitively fastened in the through-bore 4 by means of a pasty, flowing and hardenable seating agent 15. For this purpose, according to an advantageous mounting process, sealing plates are deposited on the plate 1 on either side, in the region of the exit ports of the through-bore 4, and can be joined to one another by means of the auxiliary journal already mentioned. These sealing plates are applied seatingly both to the faces of the plate and to the front faces of the two compensating elements 6 and 7 and thereby shut off the annular slots 11 towards the outside. One of the sealing plates is provided with a filling orifice which communicates with one of the annular slots 11. The other seating plate is provided with an air-exhaust and monitoring orifice which communicates with the other annular slot.

The sealing agent 15 is then introduced from outside into the first annular slot 11 and it first fills the tatter completely. Under the effect of gravity or else under pressure, it passes via the first radial bore 12 into the first annular groove 13, via the longitudinal running groove 14 into the second annular groove 13 and, finally, via the second radial bore 12 into the second annular slot 11 located opposite. After the seating agent has likewise filled the latter, it finally emerges via the relatively narrow air-exhaust orifice. This exit can be monitored and used as an indication of the complete filling of the annular slots 11, of the bores 12 and of the grooves 13, 14. FIGS. 1 and 2 of the drawing have dispensed with also illustrating the seating agent in the bores 12 and the grooves 13, 14 purely for the sake of clarity.

After the hardening of the seating agent 15, the sealing plates and the auxiliary journal are removed and any excesses of seating agent are eliminated. The assembly element is sealed in a stable position in the through-bore 4 of the plate 1, and the position of the central axis of the rod-shaped fastening element is fixed clearly in relation to the sides of the plate. If seating agents with endothermic hardening are used, a supply of heat may be provided directly by the sealing plates of the mounting fixture.

Figure 6:
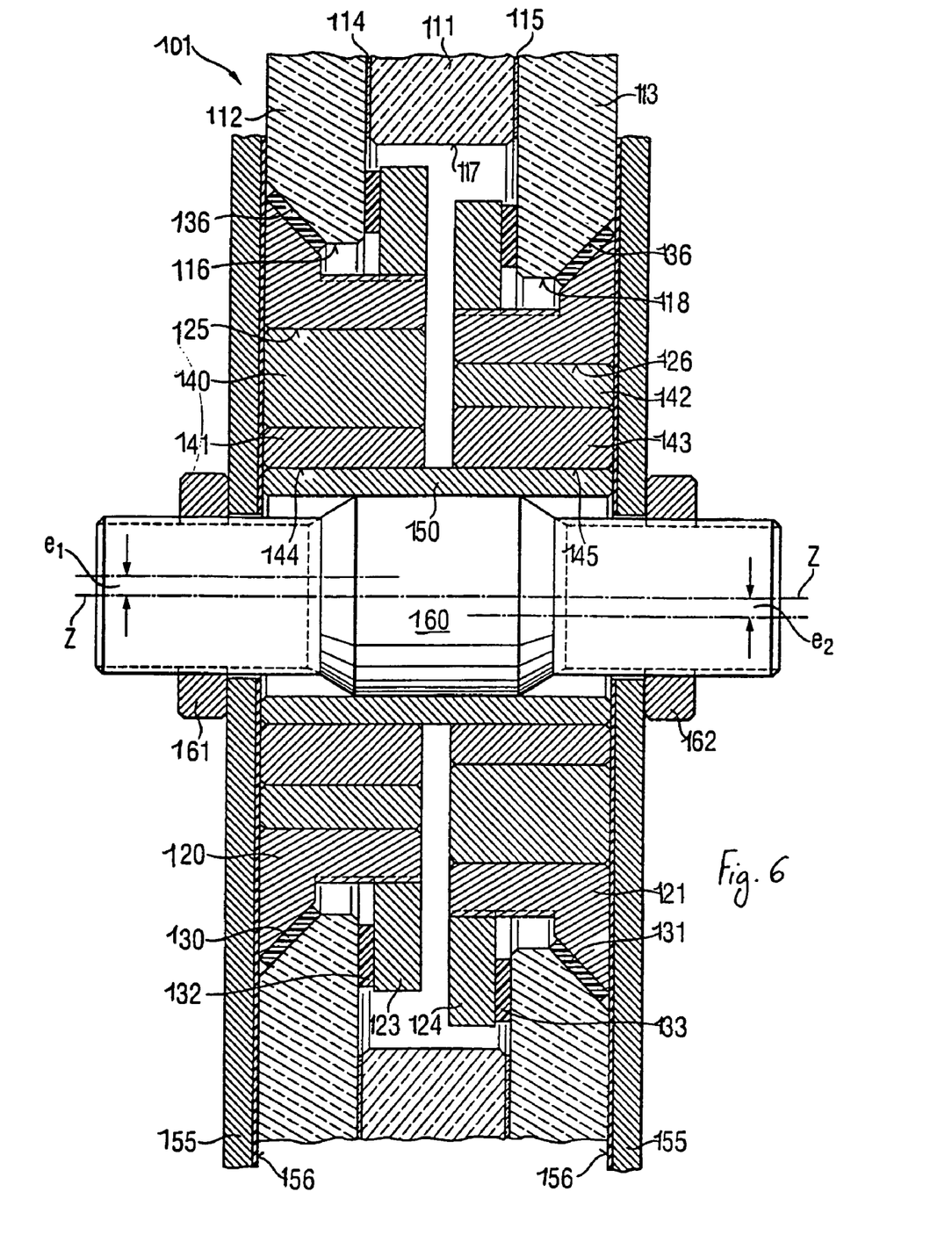
FIG. 6 shows a first embodiment of a laminated pane cooperating with a screw bolt, illustrated in section.

According to FIG. 6, the laminated pane 101 is composed of a partially tempered central pane 111 and of two outer panes 112 and 113 of substantially equal thickness and made of tempered safety glass. The instructions relating to partial tempering and tempering may be found, for example, in the standards EN 1863 and EN 12150 respectively. The outer panes 112 and 113 are each assembled together with the central pane 111 by means of adhesive layers consisting of thermoplastic adhesive films 114 and 115. The thermoplastic adhesive films 114 and 115 are composed of polyvinyl butyral with a thickness of 1.52 mm. In the individual panes 111, 112 and 113 are located holes 116, 117 and 118 which form a passage through the laminated pane 101. The hole 117 in the central pane has, in this particular case, a larger diameter than the holes 116 and 118 which, in turn, are provided with a frustoconical chamfer 136 in the direction of the outer surfaces of the laminated pane 101. In these frustoconical chamfers 136, the embedded heads of the bush-like screws 120 and 121 provided with through-bores 125 and 126 are fitted, with intermediate layers 130 and 131 interposed, and are tightened by means of the nuts 123 and 124. The screws and nuts are illustrated, here, without devices for the application of a tool. Intermediate layers 132 and 133 are likewise arranged between the nuts 123 and 124 and the outer panes 112 and 113. The intermediate layers may be composed of a plastic material, such as polyamide, or else of a malleable metal, for example malleable aluminium or copper. They serve for preventing detrimental surface pressures between the panes and the screwed assemblies which, as a general rule, consist of a suitable steel.

To compensate the axial offset between the holes 116 and 118 or the through-bores 125 and 126, two pairs of eccentric rings 140 and 141 and also 142 and 143 are respectively fitted into these. These rings are adjustable by rotation in such a way that they form two round mounting holes 144 and 145 of the same diameter which are aligned axially with the same centre Z; the eccentricities e1 and e2 of the holes 116 and 118 are therefore compensated with respect to the centre line Z.

The pairs of eccentric rings are composed of two round rings, each having a borehole. The outside diameters of the largest rings 141 and 143 correspond to the through-bores 125 and 126, whilst the outside diameters of the smallest rings 140 and 142 correspond to the diameter of the off-centred bores in the largest rings 141 and 143. Finally, the off-centred bores in the smallest rings form the mounting holes 144 and 145.

Arranged in the mounting holes 144 and 145 is a bush 150 which passes through the laminated pane and which serves for receiving a rod-shaped threaded bolt 160 capable of being assembled together with other structural elements. Other structural elements used are metal leaves 155 which are fastened to the threaded bolt by means of two nuts 161 and 162, with polyamide intermediate layers 156 being interposed. The leaves 155 cover the bush 150 and the eccentric rings 140, 141, 142, 143 and thus limit their axial play. The longitudinal dimension of the bush 150 is selected such that it serves as a spacer piece for the bolted assembly of the threaded bolt 160 together with the nuts 161/162, so as not to exert pressure forces on the laminated pane 101 and the screwed assemblies 120/124 and 121/123. The load introduced by the threaded bolt 160 is transmitted into the outer panes by the frustoconical chamfers 136.

The leaves 155 may be assembled with an infrastructure, in order to fasten the laminated pane 101. It is also possible, however, by means of the leaves 155, to assemble a plurality of laminated panes in longitudinal alignment over great lengths. Likewise, the fastening of the leaves to a laminated pane may also be carried out, depending on the statics of the structure as a whole, by means of a plurality of threaded bolts which pass, at a defined distance from one another, through mounting holes in the laminated pane.

The holes and the outside diameters of the screws 120 and 121, of the eccentric rings 140, 141, 142 and 143, of the bush 150 and of the threaded bolt 160 are all dimensioned such that they can be mounted without any play.

The laminated pane 101 is manufactured in the following way: in the first place, the screwed assemblies 120/124 and 121/123 must be installed on the outer panes 112 and 113. The nuts 123 and 124 and the threaded bushes 120 and 121 are freely accessible at this moment, so that a reliable clamping and controlled application of the tool can be ensured. The individual panes 111, 112 and 113 are subsequently joined together in the form of a stack of layers, with thermoplastic adhesive films 114 and 115 interposed, and are assembled into a laminated pane 101 by the application of heat and/or pressure. Since the axial compensation of the through-bores 125 and 126 subsequently takes place with the aid of the eccentric rings, the panes can be joined together with only approximate centring in relation to the holes 116 and 118. The manufacture of the laminated panes is markedly simplified thereby. The axial compensation of the through-holes 125 and 126 can be carried out on site during the mounting of the laminated pane 101. It is also possible, however, to insert and align the eccentric rings 140, 141, 142, 143 and the bush 150 in the through-bores 125 and 126 even after the assembly of the individual panes 111, 112, 113 into a laminated pane 101. In this case, however, a temporary fastening of these components must be ensured by means of an adhesive tape or a glue, in order to prevent axial slips during transport to the site.

Figure 7:
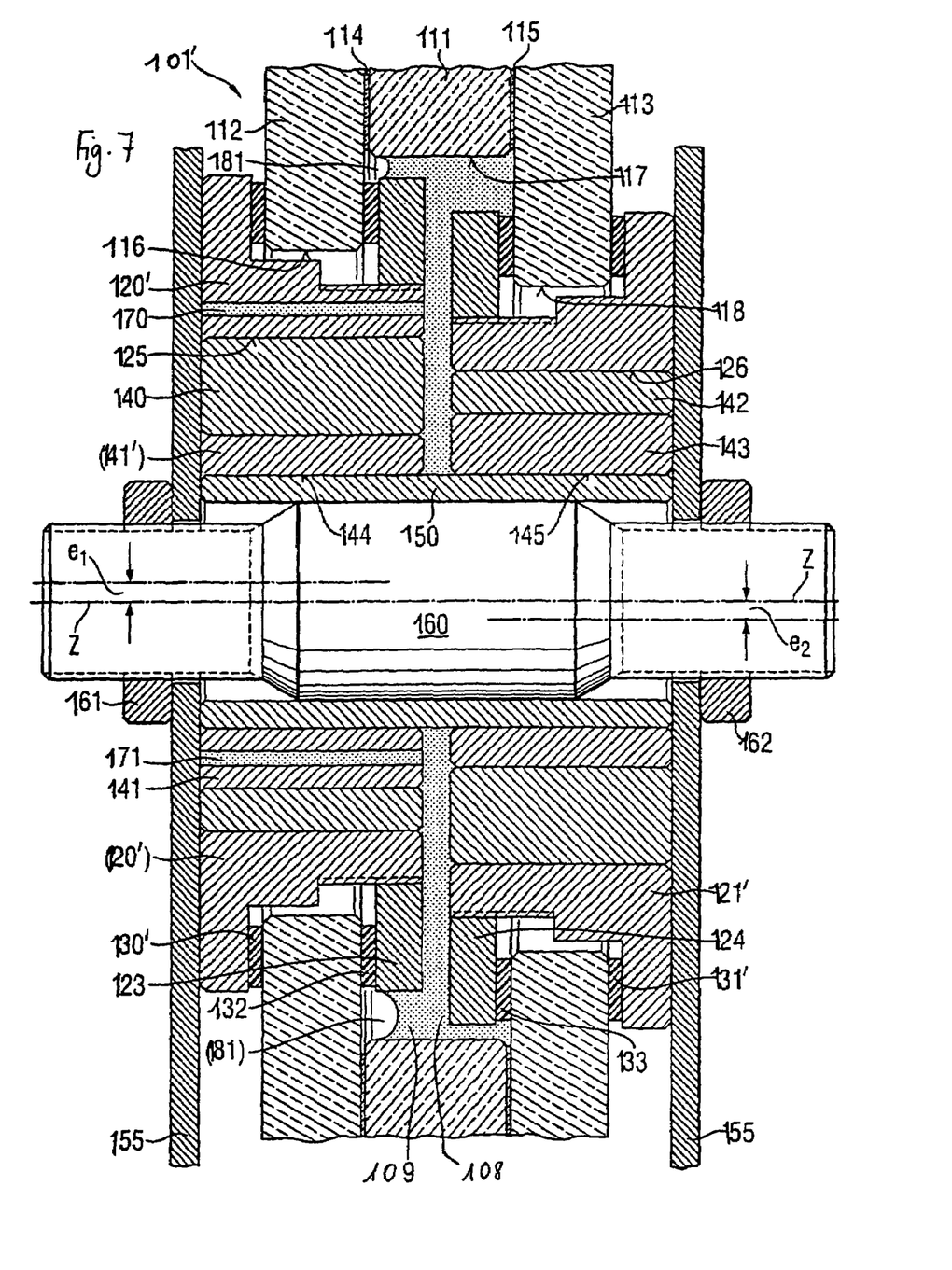
FIG. 7 illustrates the second embodiment with the hollow space seated.

The illustration of FIG. 7 corresponds essentially to that of FIG. 6, and therefore only the differences will be examined. In this case, the screws 120' and 121' are applied to the outer surfaces of the laminated pane 101 with their projecting heads, with elastic intermediate layers 130' and 131' being interposed. The screw 120' is provided with a through-duct 170 which issues into an intermediate space 108. A duct 171 is made in the eccentric ring 141' and likewise issues into the intermediate space 108. After a moulding resin 109 has been introduced through the two ducts 170 and 171 serving as an introduction and air-exhaust conduit, the entire intermediate space 108 is filled with moulding resin. To introduce the moulding resin 109, the laminated pane 101 is tilted substantially into a horizontal position, so that the two ducts 170 and 171 are directed upwards. The fluid moulding resin 109 is then poured in via the duct 170, whilst the displaced air can escape via the duct 171. The intermediate space 108 is thus filled almost completely, and only small air bubbles can still persist in the angle 181 of the intermediate space 108. After the moulding resin 109 has reacted to form a solid mass which also shuts off the ducts 170 and 171, loads can also be transmitted via the central pane 111.

If necessary, the inclusion of air bubbles in the angle 181 of the intermediate space 108 can also be largely avoided if the seating washers 133 and 134 are segmented, hence provided with interruption lines, and if air-exhaust ducts are machined in the clamping nuts 123 and 124.

The invention claimed is:

1. Assembly element configured to be inserted into a bore passing through a plate, comprising:
   at least one outer compensating element and one inner compensating element, in which the outer compensating element is provided for transmitting forces to an inner surface of a hole of the bore of the plate, and the inner compensating element is configured to be inserted with a close fit into a bore arranged eccentrically in the outer compensating element and is provided for positioning a longitudinal axis of a fastening element within the bore of the plate,
   wherein the assembly element, produced with a smaller radial dimension with respect to at least one exit of the bore in an outer face of the plate for forming a slot is configured to be fastened in the bore by a sealing agent filling the slot.

2. Assembly element according to claim 1, wherein the inner and outer compensating elements include ducts that are at least tangent to a parting plane between the inner and outer compensating elements and that are configured to be filled with the sealing agent after insertion of the inner and outer compensating elements into the bore of the plate and that are configured to be fastened relative to one another as a result of hardening of the sealing agent after introduction of the sealing agent into the ducts.

3. Assembly element according to claim 1, wherein the inner compensating element is assembled firmly together with a rod-shaped fastening element that projects at least on one side and the longitudinal axis of which is arranged in an off-centered position with respect to a longitudinal axis of the inner compensating element.

4. Assembly element according to claim 2, wherein the inner compensating element includes an eccentric supporting bore configured to receive a rod-shaped fastening element.

5. Assembly element according to claim 4, wherein the ducts do not communicate with the supporting bore of the inner compensating element.

6. Assembly element according to claim 2, wherein the ducts establish, between two portions of the assembly element that are located in two exit regions of the bore passing through the plate, continuous communication that follows or touches at least one point of the parting plane between an inner surface of the hole of the outer compensating element and a lateral surface of the inner compensating element.

7. Assembly element according to claim 2, wherein the ducts establish, between two orifices located in an exit region of the bore made in a form of a blind bore in the plate, continuous communication that follows or touches at least one point of the parting plane between an inner surface of the hole of the outer compensating element and a lateral surface of the inner compensating element.

8. Assembly element according to claim 2, wherein the ducts issue in the lateral surface of the outer compensating element.

9. Assembly element according to claim 8, wherein exit ports of the ducts are formed by radial bores that connect the lateral surface of the outer compensating element to the bore of the outer compensating element.

10. Assembly element according to claim 8, wherein at least one duct is made in the lateral surface of the inner compensating element and fluidically connects to another one of the ducts issuing in the lateral surface of the outer compensating element.

11. Assembly element according to claim 1, wherein two annular grooves and at least one other groove connecting the two annular grooves are made in a lateral surface of the inner compensating element.

12. Plate with at least one assembly element according to claim 1 inserted into a bore of the plate and fastened in the bore by a hardened sealing agent.

13. Plate according to claim 12, wherein composed, as a laminated plate, of at least three sheets assembled together, in which plate the bore of each inner sheet is narrower than the bores in the outer sheets, an outside diameter of the assembly element corresponds at least approximately to an inside diameter of the bore in the inner sheet, and slots provided in two exit regions of the bore between an outer lateral surface of the assembly element and an inner surface of the hole of the exit region in question are filled with the sealing agent.

14. Assembly between at least two plates according to claim 12, comprising fittings that cover an edge-to-edge joint between the plates and that are fastened to the individual plates by rod-shaped fastening elements positioned by the assembly elements.

15. Method for fastening an assembly element according to claim 1 in the bore of the plate, the bore having, at least in its exit regions, a larger radial dimension with respect to the assembly element, wherein:
   by a fixture, a position of the assembly element in the bore is fixed, with the inner and outer compensating elements aligned in an exact position for positioning of the longitudinal axis of a fastening element within the bore, and the exit regions of the bore are shut off on both sides, the sealing agent is introduced from one side of the plate and first fills an intermediate space between a lateral surface of a first exit of the bore and the assembly element, which sealing agent is subsequently conducted through ducts communicating with the intermediate space and provided within the assembly element and fills a second intermediate space between a lateral surface of a second exit of the bore and the assembly element, ingress of the sealing agent being terminated after the filling of the second intermediate space, and hardening of the sealing agent is carried out.

16. Method for fastening an assembly element according to claim 1 in the bore of the plate, the bore being a blind bore, the blind bore having, at least in its exit region, a larger radial dimension with respect to the assembly element, wherein:

by a fixture, a position of the assembly element in the blind bore is fixed, with the inner and outer compensating elements aligned in an exact position for positioning the longitudinal axis of a fastening element within the blind bore, and the exit region of the blind bore is shut off, a sealing agent is introduced, which first fills an intermediate space between a lateral surface of the exit of the bore and the assembly element and is subsequently conducted through ducts that communicate with the intermediate space and are provided within the assembly element and that lead to an exhaust and outlet orifice arranged in the exit region of the blind bore, the ingress of the sealing agent being terminated after it has reached the exit orifice, and hardening of the sealing agent is carried out.

17. Method according to claim 15, wherein when a hot-hardened sealing agent is used, a supply of heat is provided by the fixture after complete filling of the spaces and of the ducts.

* * * * *